United States Patent [19]

Kuwabara et al.

[11] Patent Number: 5,610,401

[45] Date of Patent: Mar. 11, 1997

[54] RADIANT RAY-DETECTOR AND METHOD FOR PRODUCING SAME

[75] Inventors: Yoshinori Kuwabara; Toshihiko Ryuo, both of Gunma, Japan

[73] Assignee: Shin-Etsu Chemical Co., Ltd., Tokyo, Japan

[21] Appl. No.: 615,726

[22] Filed: Mar. 14, 1996

Related U.S. Application Data

[63] Continuation of Ser. No. 218,657, Mar. 25, 1994, abandoned.

[30] Foreign Application Priority Data

Apr. 5, 1993 [JP] Japan .................................. 5-078241

[51] Int. Cl.$^6$ ...................................... G01T 1/20
[52] U.S. Cl. ............................................ 250/367
[58] Field of Search ............................... 250/367

[56] References Cited

U.S. PATENT DOCUMENTS

| | | | |
|---|---|---|---|
| 5,091,650 | 2/1992 | Uchida et al. | 250/366 |
| 5,227,634 | 7/1993 | Ryuo | 250/368 |

FOREIGN PATENT DOCUMENTS 2-252698  10/1990  Japan .
4-290984  10/1992  Japan .

Primary Examiner—Constantine Hannaher
Attorney, Agent, or Firm—McAulay Fisher Nissen Goldberg & Kiel, LLP

[57] ABSTRACT

A radiant ray-detector having a high resolving ability and capable of being easily produced as well as a method for producing the same are herein disclosed. The radiant ray-detector comprises a plurality of photomultiplier tubes 11 combined together and scintillator chips 1, wherein the scintillator chips 1 each is in the form of a hexahedron, more than one face thereof is mirror finished, the other faces are surface-toughened and a number of these scintillator chips 1 greater than the number of the photomultiplier tubes 11 are joined together so that the overall area of the resulting mirror surface of a group of scintillator chips 1 is approximately identical to the area of an entrance window 12 of each corresponding photomultiplier tube 11 and wherein different transmittances are imparted to individual coarse faces 4 of the scintillator chip 1 joined to those of other scintillator chips. In particular, the transmittances of these scintillator chip 1 are preferably designed such that they increase as the distance between the chips and the center of the group of chips increases. The method for producing the radiant ray-detector is characterized in that the transmittance of each joined face 4 of the scintillator chip 1 is controlled by properly selecting the particle size of abrasive grains used for finishing each coarse face.

6 Claims, 3 Drawing Sheets

——— a : Coarse Face Approximately Identical to Mirror Surface

—·—·— b : Transmittance 10 %

— — — — c : Transmittance 3 %

············ d : Transmittance 0.5 %

RADIANT RAY-DETECTOR AND METHOD FOR PRODUCING SAME

This is a continuation of application Ser. No. 08/218,657, filed Mar. 25, 1994, now abandoned.

BACKGROUND OF THE INVENTION

The present invention relates to a radiant ray-detector used in an apparatus for radiation therapy and radiological diagnosis such as X-ray computed tomography unit (X-ray CT unit) and positron computed tomography unit (positron CT unit) and radiation-determining machinery and tools for high energy-physical studies as well as a method for producing the radiant ray-detector.

One of the known radiant ray-detectors comprises a photomultiplier tube and a scintillator connected to the photomultiplier tube. When radiant rays are incident into the detector, the scintillator emits light rays and the photomultiplier tube converts the emitted light rays into electric signals for the amplification thereof. The scintillator capable of emitting light rays makes use of $Bi_4Ge_3O_{12}$ crystal (hereunder referred to as "BGO crystal").

The detection of radiant rays sometimes requires the analysis of a point into which the radiation is incident (hereunder referred to as "radiant ray-incident point"). In such case, a specific radiant ray-detector is used, which comprises a plurality of photomultiplier tubes and a plurality of scintillator chips or scintillator blocks (several chips or blocks each for each entrance window of the photomultiplier tube). Japanese Patent Provisional Publication No. 4-290984 discloses a joined body of scintillator blocks for fitting to the entrance window of a radiant ray-detector capable of analyzing the radiant ray-incident points. More specifically, the reflectivities of interfaces between every neighboring two blocks differ from one another or each scintillator block is separated from the neighboring block(s) by a filler such as a $BaSO_4$ powder or a reflecting material such as a TELFON (a fluorocarbon) tape.

The device as disclosed in the foregoing patent suffers from problems in that when radiant rays are incident upon a scintillator chip and converted into light rays, the quantity of the light transferred to the neighboring chips should be evaluated, but the quantity cannot accurately be determined through the detection of the reflectivity.

SUMMARY OF THE INVENTION

Accordingly, an object of the present invention is to provide a radiant ray-detector which makes use of scintillator chips surface-treated by a method different from the foregoing ones, which is highly accurate and can provide a high resolution and which can be produced with ease as well as a method for producing the radiant ray-detector.

The radiant ray-detector according to the present invention comprises a plurality of photomultiplier tubes and scintillator chips, the scintillator chips each being in the form of a hexahedron, more than one face thereof being mirror finished, the other faces being surface-toughened and a number of these scintillator chips greater than the number of the photomultiplier tubes being joined together so that the overall area of the resulting mirror surface of a group of scintillator chips is approximately identical to the size of area of an entrance window of each corresponding photomultiplier tube, wherein different transmittances are imparted to individual coarse faces of each scintillator chip joined to those of other scintillation chips. In particular, the transmittances of a group of these scintillator chips are preferably designed in such a manner that they increase as the distance between the chips and the center of the group of the chips. The method for producing the radiant ray-detector of the present invention is characterized in that the transmittance of each face of the scintillator chip joined to that of another scintillator chips is controlled by properly selecting the particle size of abrasive grains used for finishing each coarse face.

DETAILED DESCRIPTION OF THE INVENTION

Figure 1:
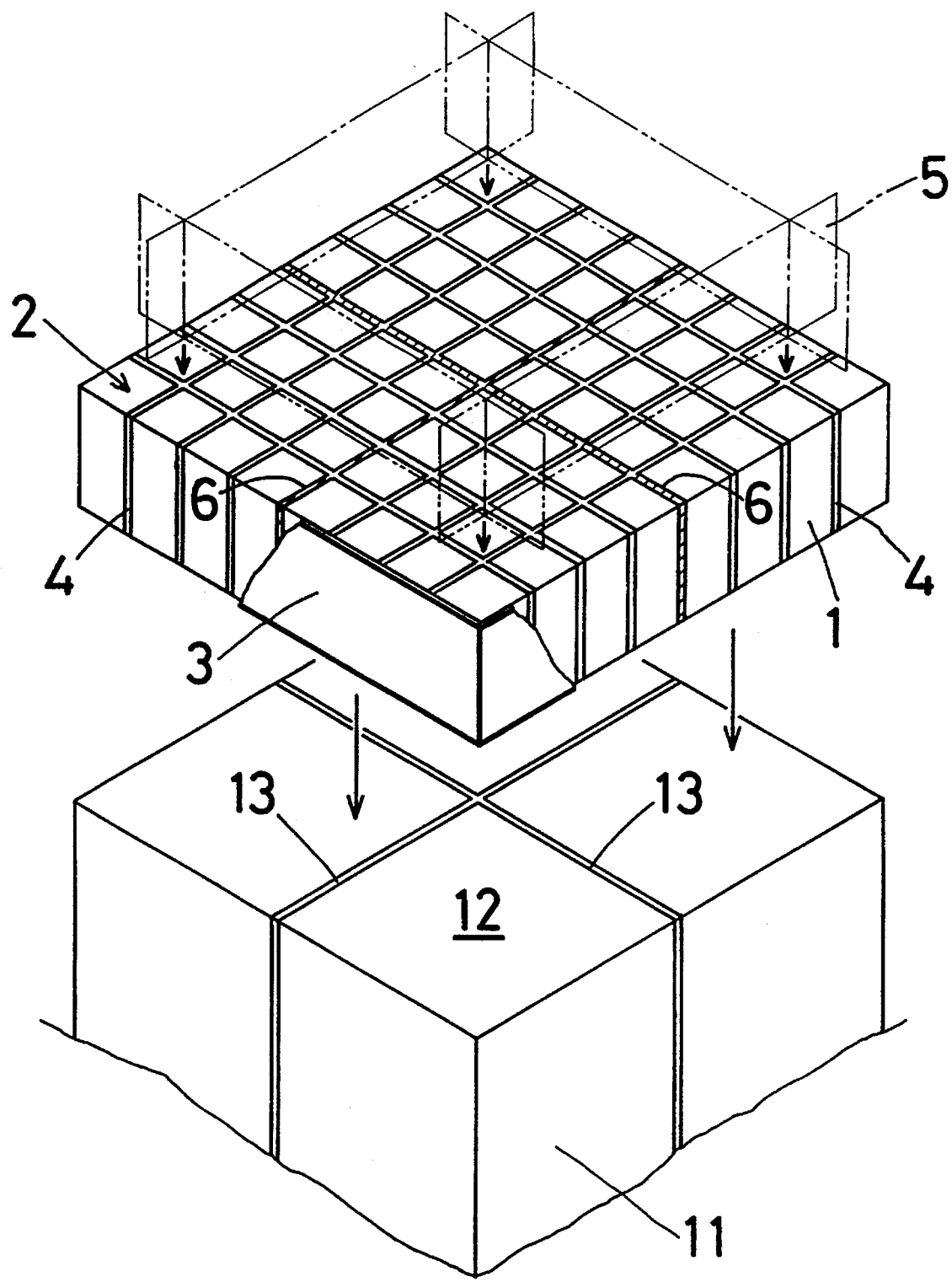
FIG. 1 is a diagram showing the correspondence of photomultilpier tubes and scintillator chips in the radiant ray-detector according to the present invention.

As seen from FIG. 1, the radiant ray-detector according to the present invention comprises a plurality of photomultiplier tubes 11 and scintillator chips 1, the scintillator chips 1 each being in the form of a hexahedron, more than one face thereof being mirror finished, the other faces being surface-roughened, a number of these scintillator chips 1 greater than the number of the photomultiplier tubes 11 being joined together so that the overall area of the resulting mirror surface of a group of the scintillator chips 1 is approximately identical to the area of the entrance window 12 of each corresponding photomultiplier tube 11, wherein different transmittances are imparted to individual joined coarse faces 4 of the scintillator chips 1. In particular, the transmittances of a group of these scintillator chip 1 are preferably designed in such a manner that they increase as the distance between the chips and the center of the group of the chips increases.

The method for producing the radiant ray-detector according to the present invention which comprises the steps of providing a plurality of photomultiplier tubes 11 combined together; preparing a plurality of scintillator chips 1 by mirror-finishing more than one face of each hexahedral body and surface-roughening the other faces thereof; and joining, together, a number of the scintillator chips greater than the number of the photomultiplier tubes 11 so that the overall area of the resulting mirror surface of a group of these scintillator chips 1 is approximately identical to the area of the entrance window 12 of each corresponding photomultiplier tube 11, the method being characterized in that the transmittances of individual coarse faces 4 of the scintillator chip 1 joined to the coarse faces of other scintillator chips are controlled by properly selecting the particle size of abrasive grains used for finishing these coarse faces.

When γ-rays are incident into the radiant ray-detector of the present invention, they transmit through the coarse faces of the scintillator chips 1 and emits light rays within the detector. The light rays thus emitted enter into the photomultiplier tubes 11 through the mirror surfaces of the scintillator chips 11 and the entrance window 12 of the photomultiplier tube 11 and they are converted into electric signals in the photomultiplier tube 11. If the mirror surfaces of a plurality of the scintillator chips 1 whose coarse faces have different transmittances respectively are arranged on a surface, the light rays transmitting through the mirror surface behave in various ways. For instance, almost all of the light rays generated in a certain scintillator chip 1 are outputted through the mirror face of the same scintillator chip 1 from which the light rays are emitted. On the other hand, a part of the light rays emitted from another scintillator chip 1 pass through the joined coarse faces 4 thereof and are thus outputted through the mirror surfaces of the neighboring scintillator chips 1.

If the mirror faces of the scintillator chips 1 are arranged in such a manner that they correspond to the entrance window 12 of the combined photomultiplier tubes 11, the height of pulses generated in the photomultiplier tubes 11 vary depending on the positions on which γ-rays are incident. It can be observed that the multiplier tubes variously respond, for instance, only a specific photomultiplier tube detects a strong pulse or the pulse height is properly distributed to neighboring two or more photomultiplier tubes. The analysis of the positions of the photomultiplier tubes 11 which make response, the combination of the response-making tubes and the height of the pulse observed naturally allows the correct identification of the position on the finely divided scintillator chips 1, into which the γ-rays are incident, even if only a few photoelectron multiplier tubes 11 are used.

The present invention will hereunder be explained in more detail with reference to the following Embodiments, but the present invention is not restricted to these specific Embodiments.

FIG. 1 is a diagram showing the correspondence of photomultiplier tubes 11 and scintillator chips 1 in the radiant ray-detector according to the present invention.

In this embodiment, 4 photomultiplier tubes 11 are combined and the entrance windows 12 thereof are arranged on the same plane. There are spreaded 64 scintillator chips 1 all over these 4 entrance windows 12 to thus form radiant ray-incident surface 2 on the assembly and the side walls of the joined scintillator chips 1 are covered with a light-reflecting barium sulfate film 3.

Figure 2:
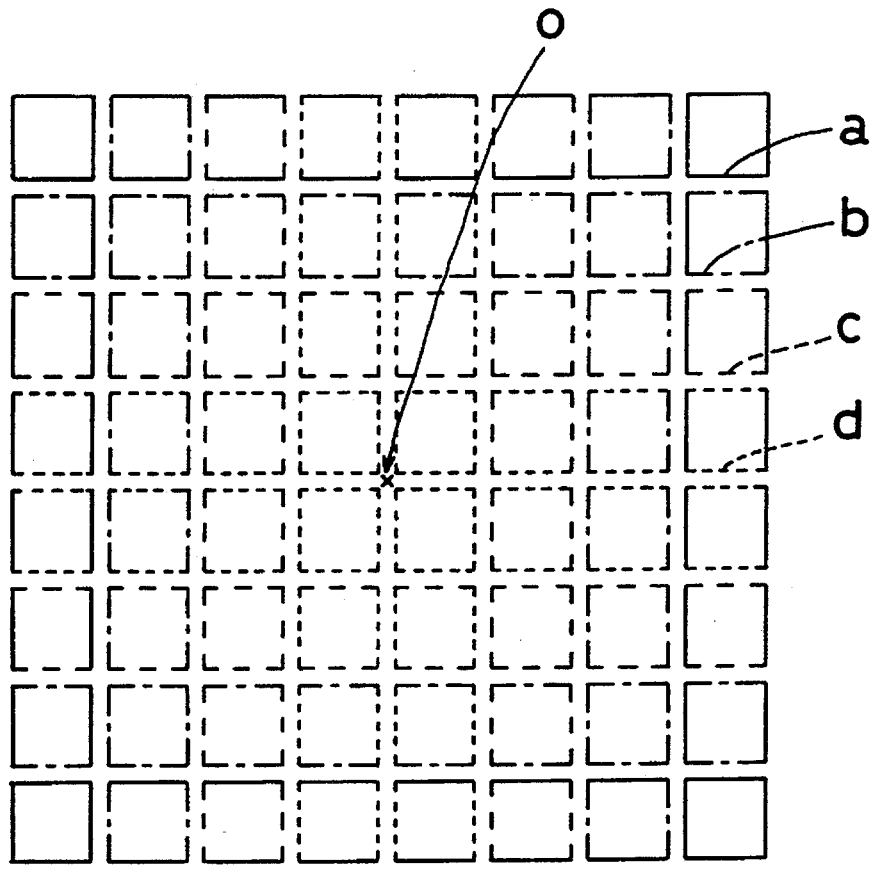
FIG. 2 is a diagram illustrating the arrangement of scintillator chips having transmittances different from one another.

Each scintillator chip 1 is in the form of a hexahedron having a size of 30 mm×6 mm×3 mm and one of the faces having a size of 6 mm×3 mm is mirror-finished. The mirror surface faces the entrance window 12 and the scintillator chips 1 are densely arranged in a square form of 8 columns×8 rows, joined together and divided into 4 groups by central lines 6. Thus, a number of chips (16 chips each) are arranged on each one of the corresponding 4 entrance windows 12. In each chip 1, only one face arranged such that it faces the entrance window 12 is mirror finished, while the other 5 faces are all subjected to a surface-roughening treatment. The transmittances of the joined faces situating in the central area of a group of the chips joined together are different from those of the joined faces positioned at the periphery of the group of the joined chips in such a manner that the transmittance of a specific chip increases as the distance between the chip and the center increases. FIG. 2 is a diagram illustrating the difference in the transmittance between the identical coarse faces of a group of the scintillator chips 1 joined together which increases in proportion to the distance from the central lines 6. The coarse face existing at the farthest position from the center O of the radiant ray-detector is coarse-finished, but is practically in an almost mirror-finished condition (see solid line a) and the transmittance thereof is not less than 50%. In this embodiment shown in FIG. 2, a reflecting material 5 such as TEFLON tape (see FIG. 1) is inserted into the interface formed between the coarse surface having a transmittance approximately equal to that of the mirror face and the neighboring face in order to clearly separate them from each other, but detectors having practically acceptable properties can be obtained without insertion of any reflecting material 5. The face of the chip situating inside the chip having the coarse surface approximately equal to the mirror face is finished in such a manner that the coarse surface thereof has a transmittance of 10% (see alternate long and short dash line b). The face of the chip situating inside the chip having the coarse surface represented by the line b is finished so as to have a transmittance of 3% (see chain line c). Moreover, the face of the chip positioned at the center of the detector is surface-finished so as to have a transmittance of 0.5% (see dotted line d). In this embodiment, the faces 6 situating on the boundary lines 13 between the photomultiplier tubes 11 are adhered to one another with a silicone resin composition (available from Shin-Etsu Chemical Co., Ltd. under the trade name of KE-109) for making light-transmission therebetween easy and for thus ensuring a high light transmittance of the resulting radiant ray-detector. Other portions of the detector are attached to one another by surrounding the peripheral scintillator chips and the entire radiant ray-detector with barium sulfate powder.

A desired transmittance is imparted to each coarse-finished face of each scintillator chip 1 in the following manner. The face of each chip opposite to the mirror-finished face thereof is subjected to lapping with GC #1000 green carbon free abrasive grains to give each corresponding radiant ray-incident face 2. Other faces of the chip are also subjected to lapping with abrasive grains having particle size properly selected depending on the final position thereof and then heat-treated. Thereafter, the faces are, if desired, treated through immersion in a strong acid solution.

When concentrated nitric acid is, for instance, used as the strong acid solution, the faces are subjected to lapping with GC #1000 green carbon free abrasive grains, then immersed in concentrated nitric acid for 15 seconds and subjected to annealing at 900° C. for 16 hours. The transmittance of the resulting face is 1.5%. If the face is not immersed in concentrated nitric acid, the transmittance of the resulting face is on the order of 0.5%. In other words, the immersion in concentrated nitric acid can improve the transmittance of the face treated.

When γ-rays are incident into the position in the proximity of the center of the radiant ray-incident face 2 of the foregoing radiant ray-detector, the 4 photomultiplier tubes 11 respond thereto in almost identical intensities. When γ-rays are incident into the position in the proximity to the boundary line 13 between the neighboring two photomultiplier tubes 11, both of these photomultiplier tubes 11 respond thereto, but there is a difference in the intensity of the response between the peripheral and central portions. In this respect, it would be judged that the light incident-point exists near the center of the detector when the difference is large, while it exists near the peripheral portion thereof when the difference is small. Moreover, it would be judged that the γ-rays are directly incident into the photomultiplier tube which showed a higher response. When γ-rays are incident into either of the 4 corners of the square radiant ray-incident face 2, only one photomultiplier tube strongly responds thereto.

Figure 3:
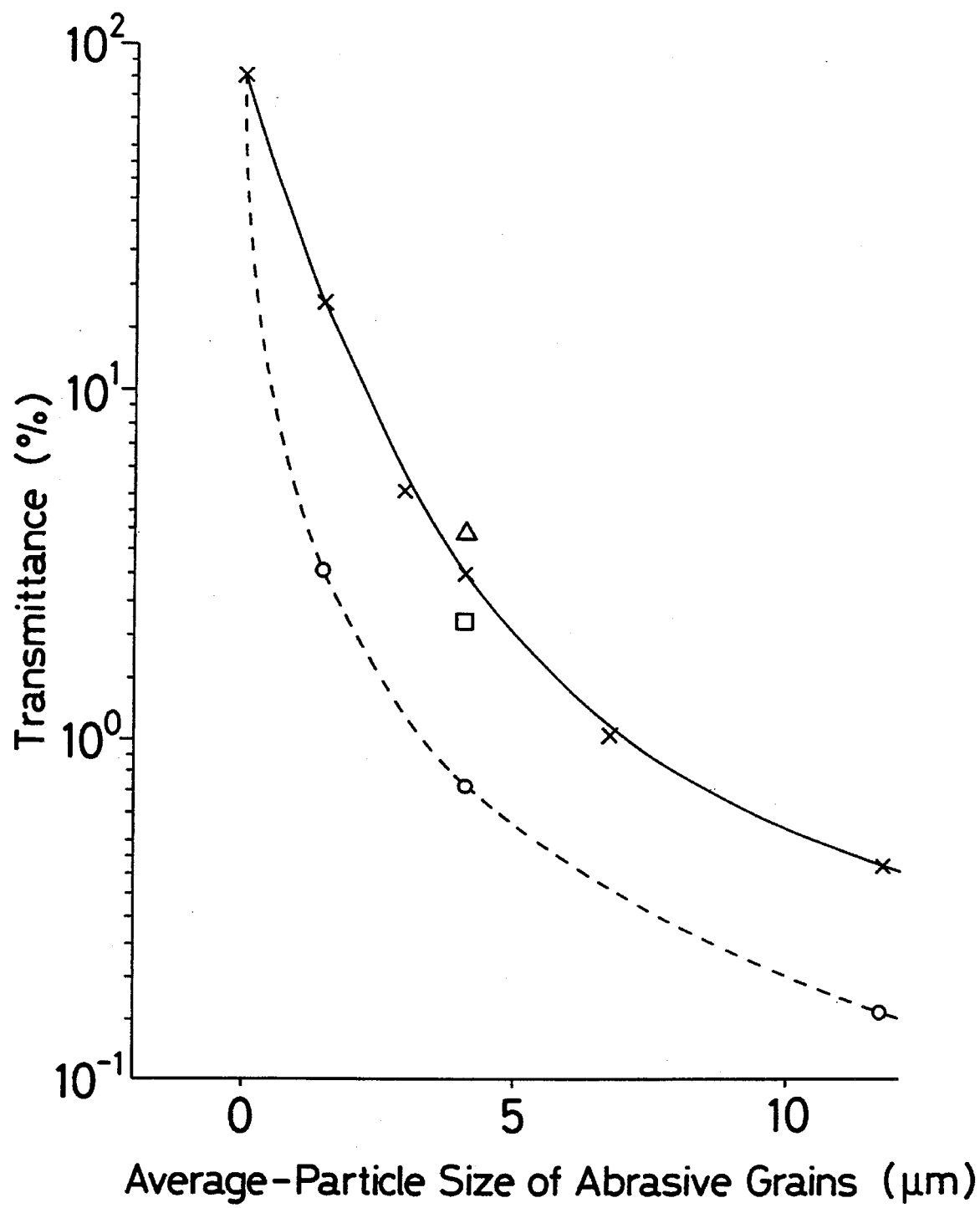
FIG. 3 is a graph showing the reflectivity of a coarse-finished joined face of each chip as a function of particle size of abrasive grains used in the finishing treatment and the temperature of the heat-treatment carried out after the surface-finishing treatment.

The inventors of this invention examined the relation between the transmittance of the coarse-finished faces observed at a wavelength of 480 nm and the particle size of the abrasive grains used in the coarse-finishing treatment and the heat-treatment. The results thus obtained are plotted on the graph shown in FIG. 3. In FIG. 3, ○ represents the transmittance of the faces which are not subjected to any heat-treatment after the coarse-finishing and X represents the transmittance thereof observed after exposing to a temperature of 900° C. for 16 hours. □ and △ represent transmittances thereof observed after exposing to temperatures of 890° C. and 910° C. for 16 hours, respectively. The wavelength of 480 nm corresponds to the central wavelength of the scintillation light emitted from a BGO crystal which is considered to be a representative scintillator. The results plotted on FIG. 3 indicate that coarse-finished faces having various transmittances falling within the range of from 0.2% to 80% can considerably be obtained freely by properly selecting the particle size of the abrasive grains used in the coarse-finishing and conditions for the heat-treatment. In addition, it was also found that the transmittance of the faces increased when the heat-treatment was performed at a high temperature region near the melting point of the crystal.

Six scintillator chips having the same size were provided. Five faces of each chip except for the face joined to the photomultiplier tube 11 were subjected to lapping with GC #1000 free abrasive grains and then heat-treated at 900° C. for 16 hours. Thereafter, 5 out of these chips were separately coated with a coating agent while changing the coated amounts. These chips were inspected for the transmittance at a wavelength of 480 nm and found to have different transmittances as shown in the following Table 1.

TABLE 1

| Sample No. | Amount of Coating Agent Applied (mg/cm$^2$) | Transmittance at Wave Length of 480 nm (%) |
| --- | --- | --- |
| 1 | not applied | 0.4 |
| 2 | 0.5 | 1.2 |
| 3 | 1 | 2.1 |
| 4 | 2 | 2.8 |
| 5 | 3 | 3.4 |
| 6 | 5 | 3.7 |

The foregoing 6 scintillator chips were arranged on the radiant ray-incident face of a photomultiplier tube 11 to give a radiant ray-detector. A silicone type resin was used as the coating agent for each scintillator chip while taking into consideration weatherability and resistance to radiation thereof. A Teflon type resin can also be used as the coating agent in place of the silicone type one. The resin as the coating agent was applied to the faces by a spray type coating device. The application of the coating agent may likewise be carried out through brushing. It is confirmed that the resulting radiant ray-detector has high positional resolution as compared with that achieved by the conventional radiant ray-detectors. Incidentally, the faces opposed to one another in the scintillator chips used in this embodiment were subjected to the same finishing treatment, but may likewise be subjected to different finishing treatments respectively.

In general, the surface-roughness is reduced through surface-graining with abrasive grains and this results in an increase of the transmittance thereof. However, if the scintillator crystal is distorted through the surface-graining, the light-emitting characteristics of the resulting detector are correspondingly deteriorated. The strains produced through the surface-graining can be eliminated by a heat-treatment or an etching treatment as disclosed in, for instance, Japanese Patent Provisional Publication No. 2-252698. Thus, it is found that the control of the transparency of the scintillator chip 1 is desirably carried out by any proper combination of heat-treatments, dipping treatments in strong acid solutions and/or coating treatments after mechanically finishing to an appropriate surface roughness by lapping.

As has been discussed above in detail, in the radiation detector according to the present invention, a plurality of scintillator chips each is independently produced, properly surface-treated and then joined together. Therefore, each scintillator chip can precisely reflect the desired initial transmittance and ensures high resolution. There are only a few limitations in the production thereof and thus the detector can easily be produced.

According to the method for producing a radiant ray-detector of the present invention, the foregoing radiant ray-detector having improved characteristic properties can be produced.

What is claimed is:

1. A radiant ray-detector comprising a plurality of photo-multiplier tubes joined to a hexahedron scintillator bundle consisting of a number of hexahedron scintillator chips, the number of such chips being greater than that of the tubes, the chips having a plurality of faces, more than one of said faces being mirror finished and the remainder of the faces being roughened by treatment with abrasive grains, said bundle being formed by joining the roughened faces, the roughness of the faces being controlled by controlling the size of the abrasive grains used for the treatment and the roughness varying so that the transmittance of the bundle increases from the center of the bundle to the periphery thereof.

2. The radiant ray-detector of claim 1 wherein the scintillator chips are a $Bi_4Ge_3O_{12}$ crystal.

3. A method for producing a radiant ray-detector comprising providing a plurality of photo-multiplier tubes having entrance windows for receiving light, preparing a plurality of scintillator chips in the form of a hexahedron having a plurality of faces, mirror finishing more than one face and roughening the remaining faces by treatment with abrasive grains and joining the roughened faces of the chips together, joining the entrance windows of the tubes with the mirror finished faces of the joined chips, the number of the chips being greater than the number of tubes, such that the overall area of the joined chips is about the same as the area of the entrance windows of the tubes, and varying the transmittance of the joined chips so as to increase from the center to the periphery thereof by controlling the roughening of the chip surface by controlling the size of the grains used to roughen the chip faces.

4. The method of claim 3 wherein the scintillator chips are arranged in order that the transmittance of the joined roughened faces of the scintillator chips are increased as the distance between the chip and the center of the joined chips increases.

5. The method of claim 3 wherein the scintillator chip is a $Bi_4Ge_3O_{12}$ crystal.

6. The method of claim 3 wherein the transmittances of the roughed faces of each scintillator chip joined to those of other scintillator chips are controlled by properly selecting the particle size of abrasive grains for roughening the faces and then the transmittance thereof is further controlled through at least one treatment selected from the group consisting of a heat-treatment, an etching treatment with a strong acid and a resin-coating treatment.

* * * * *